Oct. 28, 1924.
J. J. QUINN
MEAT SLICING MACHINE
Filed Aug. 23, 1924
1,513,005
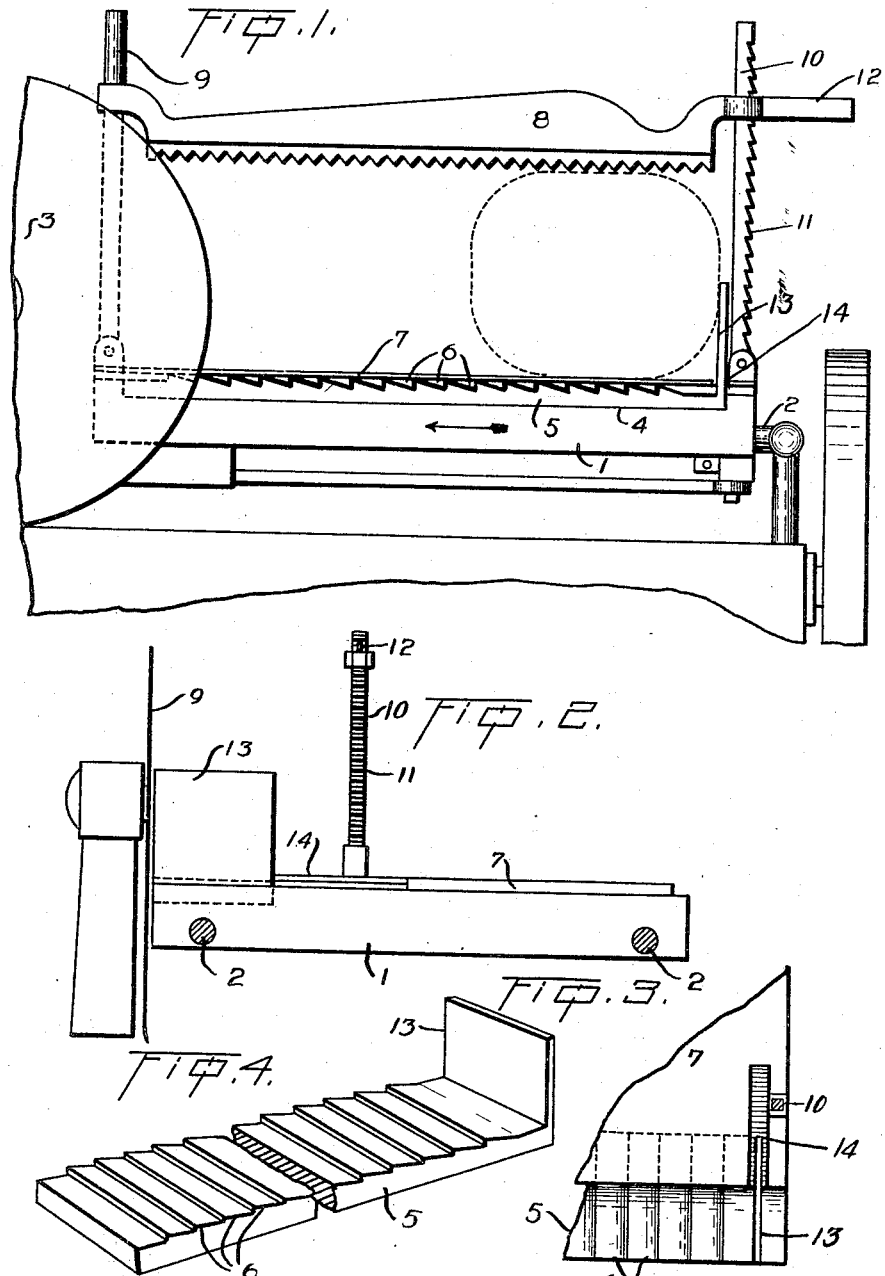
INVENTOR
JAMES JOS. QUINN
By Fetherstonhaugh & Co.
ATTYS.

Patented Oct. 28, 1924.

1,513,005

UNITED STATES PATENT OFFICE.

JAMES JOSEPH QUINN, OF MIMICO, ONTARIO, CANADA.

MEAT-SLICING MACHINE.

Application filed August 23, 1924. Serial No. 733,799.

*To all whom it may concern:*

Be it known that I, JAMES JOSEPH QUINN, a subject of the King of Great Britain, and a resident of the town of Mimico, in the county of York, in the Province of Ontario, Canada, have invented certain new and useful Improvements in Meat-Slicing Machines, of which the following is the specification.

My invention relates to improvements in meat slicing machines and the object of the invention is to devise means on the detachable serrated plate on the table of the machine for preventing the meat being cut from slipping away from the circular knife as it is fed thereonto.

My invention consists of a plate constructed and arranged all as hereinafter more particularly described and illustrated in the accompanying drawing in which:

Fig. 1 represents a front view of the upper portion of the machine showing the carriage, table and serrated plate of my particular construction.

Fig. 2 is a side elevation.

Fig. 3 is a plan view of one end of my plate and the carriage.

Fig. 4 is a perspective view of my plate.

Like characters of reference indicate corresponding parts in the different views.

1 is the table mounted on the slides 2 in the orthodox manner so as to be capable of being slid thereon past the circular knife 3 which is revolved by the usual mechanism.

The upper surface of the table has a rectangular rebate 4 adapted to receive the serrated plate 5, the upper surface of which is provided with a series of teeth 6 disposed at substantially right angles to the plane of the knife 3. 7 is the usual carriage adapted to be slid forwardly on the table 1 as the meat is fed to the knife, the mechanism automatically sliding the carriage with respect to the table not being shown as it forms no part of the present invention.

8 is the usual clamping member slidably mounted on the hinged uprights 9 and 10 on the carriage for holding cooked meats, bacon and the like in engagement therewith, the member 10 being provided with the rack 11, said member 10 extending through the handle of the member 8 which is held in any adjusted position thereon by means of the pawl 12 which engages the teeth of the rack 11.

13 is an upwardly extending flange on the outer end of the plate 5, said flange being preferably formed integrally with the plate.

14 is a slot in the carriage in the vicinity of one end thereof extending rearwardly from its forward edge in order to permit such carriage to be slid forwardly on the table the full extent without striking the flange 13.

Where meat of small height such as bacon is being cut there would be no necessity for a flange 13 on the plate 5 as the bacon would be effectively held in place by the member 8 and owing to its breadth there would not be a very great tendency of such bacon slipping away from the knife as it revolves instead of being cleanly cut thereby, but in other meats such as rolled bacon, thick back bacon and other cooked meats in which the piece to be cut is considerably more flexible than a piece of streaky bacon there is a distinct tendency for the meat to slip away from the knife as it is fed thereonto on the movement of the table 1 in the direction indicated by the arrow in Figure 1. Thus the rasher or slice is uneven in cut and very frequently the meat is torn instead of being cleanly cut. This tendency is particularly prevalent where a piece of meat is being cut close to its end. My upwardly extending flange 13 absolutely prevents this occurring as the piece of meat to be cut engages such flange, preventing any distortion of the piece that would tend to make an ununiform cut, or tear the meat as it is fed onto the knife.

Although I have described my flange as preferably constructed integrally with the plate it is to be understood that it could be constituted separately and secured thereto by any suitable means.

I have shown the plate 5 of the usual serrated form but where my flange 13 is provided this plate could be plain instead of serrated. A plain plate would obviate the tendency of the meat tearing along its lower edge which occurs at present, and moreover a serrated plate is not necessary as in my construction it is the flange that holds the meat against transverse movement away from the knife, and, not the serrated plate as is the case where the machine is unequipped with my flange.

From the above description it will be seen that I have devised a simple and effective means for preventing certain types of meat from being cut irregulaly or torn as they are sliced.

What I claim as my invention is.

1. In a meat slicing machine, in combination a circular knife, slidable table and meat engaging plate thereon, of an upwardly extending flange at the end of the plate remote from the knife, a slidable carriage adapted to slide over the plate on the table, and means on the carriage for permitting it to slide forwardly on the table so as to underlie the flange.

2. In a meat slicing machine, in combination a circular knife, slidable table and meat engaging plate thereon, of an upwardly extending flange at the end of the plate remote from the knife, a slidable carriage adapted to slide over the plate on the table, said carriage having a slot extending rearwardly from its forward edge into which the flange extends as the carriage is fed forwardly on the table so as to overlie the member engaging plate.

JAMES JOSEPH QUINN.